United States Patent [19]

Cleghorn

[11] Patent Number: 5,008,928
[45] Date of Patent: Apr. 16, 1991

[54] PUBLIC ACCESS FACSIMILE SYSTEM
[75] Inventor: Monica R. Cleghorn, Plano, Tex.
[73] Assignee: Easyfax, Inc., Plano, Tex.
[21] Appl. No.: 468,219
[22] Filed: Jan. 22, 1990
[51] Int. Cl.[5] .................. H04M 17/00; H04N 1/00
[52] U.S. Cl. ..................... 379/100; 379/144; 379/93
[58] Field of Search .............. 379/100, 144, 93, 96

[56] References Cited
U.S. PATENT DOCUMENTS

| | | | |
|---|---|---|---|
| 4,439,636 | 3/1984 | Newkirk et al. | 379/144 |
| 4,595,983 | 6/1986 | Gehalo et al. | 379/144 |
| 4,750,201 | 6/1988 | Hodgson et al. | 379/144 |
| 4,823,376 | 4/1989 | Takahashi | 379/100 |

Primary Examiner—Jin F. Ng
Assistant Examiner—Stella L. Woo
Attorney, Agent, or Firm—W. Kirk McCord

[57] ABSTRACT

An apparatus for adapting a facsimile machine for public access includes interface circuitry for connecting the machine to existing telephone lines and autodialer circuitry for automatically connecting a user of the facsimile machine to a control station, whereby the user can provide certain information to an operator at the control station, including the user's credit card number and the telephone number of another facsimile machine at the destination to which the user desires to send information. A telephone handset and hookswitch for receiving the handset when the latter is not in use are connected to the facsimile machine. When the user removes the handset from the hookswitch, he is automatically connected to the control station. The operator at the control station will verify the user's credit before enabling the facsimile machine to transmit data to the selected destination.

16 Claims, 2 Drawing Sheets

PUBLIC ACCESS FACSIMILE SYSTEM

FIELD OF THE INVENTION

This invention relates generally to facsimile machines for reading documents and producing an electronic image thereof for transmission to a remote location and in particular to a facsimile system which is adaptable for public use and access.

BACKGROUND OF THE INVENTION

Modern telecommunications has enabled the rapid transmission of information to virtually any location. Transoceanic telephone cables and satellites have greatly facilitated telephone communication throughout the world. In recent years, there has been a proliferation of facsimile machines and devices, which allow a person to transmit copies of documents via telephone lines to a remote destination almost instantaneously. Facsimile machines typically include means for reading a document and producing an electronic image thereof for transmission to a remote location. A facsimile machine at the remote location receives the electronic image transmission and reproduces it as a hard copy document.

DESCRIPTION OF THE PRIOR ART

Facsimile machines are now present in most business offices to facilitate business communications. The cost of such machines is typically prohibitive for home use.

It is known in the art to provide public access facsimile machines, whereby members of the general public can transmit documents for a fee. The fee typically depends upon the amount of time the machine is in use and the particular destination to which the copies will be transmitted. Because the copies are transmitted via telephone lines, there may be long distance telephone charges associated with the transmission of the document copies.

One type of public access facsimile system, as exemplified by U. S. Pat. Nos. 3,752,904 and 3,896,266 teach credit card utilization systems in which a facsimile machine is used to transmit a credit sale document to the user at a remote location for his signature and to transmit a copy of the signed credit sale document back to the credit issuing location. Another type of system uses a pay facsimile machine, which is similar to a pay telephone Coins are inserted into the machine to connect the user to a telecommunications network for a period of time determined by the amount of money deposited in the machine. The user can send documents via the telecommunications network during the time that he has access thereto. When the end of the network period approaches, a warning signal is given and if no additional deposit is made, the connection is automatically disconnected. This type of system is exemplified by U.S. Pat. No. 4,823,376 and by Japanese patents JA 15567 and JA 318855.

There are several disadvantages associated with prior art public access facsimile systems. An obvious disadvantage of coin-activated facsimile systems is that the user must have a sufficient supply of coins to maintain the connection to the telecommunications network. Furthermore, no operator is available to assist the user if he has difficulty making the telephone connection. The systems discussed above in which a credit sale document is transmitted to the user from a remote credit issuing location and transmitted back again are extremely complicated and expensive and require sophistocated card reading and printing equipment, as well as means for verifying the user's credit.

OBJECT OF THE INVENTION

It is therefore the principal object of the present invention to provide an improved public access facsimile system.

Another object of the invention is to provide a relatively simple, easy to use public access facsimile system.

Yet another object of the invention is to provide a public access facsimile system in which a user can obtain operator assistance if necessary.

Still another object of the invention is to provide a relatively secure, tamper-free public access facsimile system.

SUMMARY OF THE INVENTION

These and other objects are accomplished in accordance with the present invention in which an apparatus is provided for adapting a facsimile device for public usage. The facsimile device includes means for reading a document and for producing an electronic image thereof. The apparatus includes means for linking the facsimile device to an existing telecommunications system to a control station, which controls the facsimile device.

In accordance with one feature of the invention the telephone system includes means for automatically connecting by telephone, a user of the facsimile device to a human operator at the control station, whereby the user can orally provide selected information, including the identity of the remote location, to the operator. The operator of the control station effects a telephone connection between the facsimile device and another facsimile device at the remote location, thereby enabling the facsimile device to transmit the image to the remote location.

In the preferred embodiment, the apparatus includes a telephone handset and a hook switch for receiving the handset when the handset is not in use. The handset includes transducer means for converting sound energy into electrical energy and vice-versa, such that the user can communicate with the control station by voice communication. An autodialer circuit is provided for automatically connecting the user with an operator at the control station when the user removes the handset from the hook switch. The operator will obtain credit information from the user, such as the user's credit card number, and the telephone number of a facsimile machine at the remote location for receiving the image transmission. The operator will verify the user's credit information and will effect a telephone connection between the facsimile machine at the user's location and the machine at the remote location for enabling the transmission of the image data.

BRIEF DESCRIPTION OF THE DRAWINGS

Other objects and advantages of the invention will be apparent from the detailed description and claims when read in conjunction with the accompanying drawings, wherein:

DETAILED DESCRIPTION OF THE PREFERRED EMBODIMENTS

In the description which follows, like parts are marked throughout the specification and drawings, respectively. The drawings are not necessarily to scale and in some instances proportions have been exaggerated in order to more clearly depict certain features of the invention.

Figure 1:
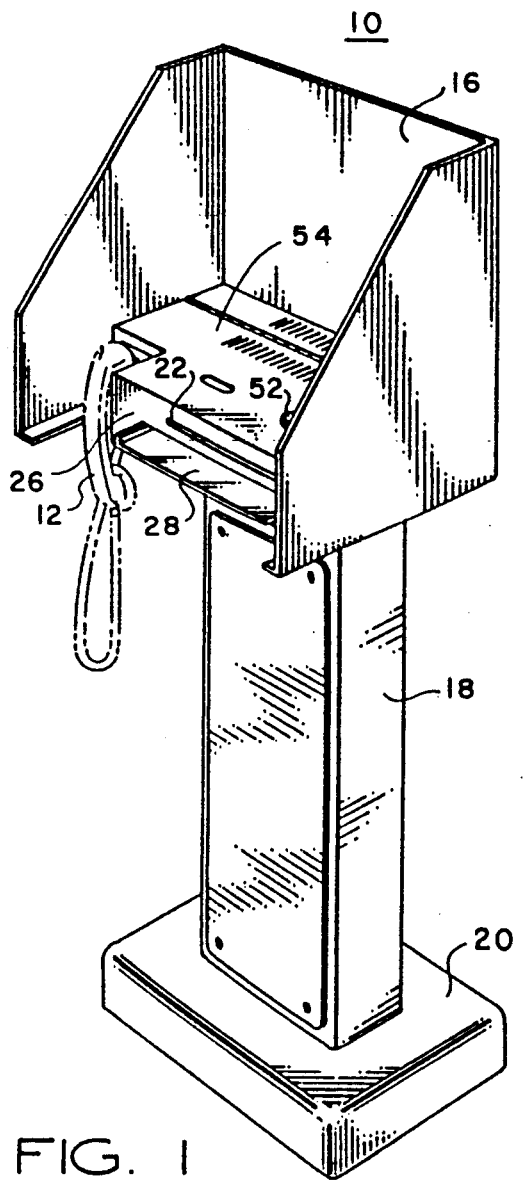
FIG. 1 is a perspective view of a facsimile device according to the present invention.
Figure 2:
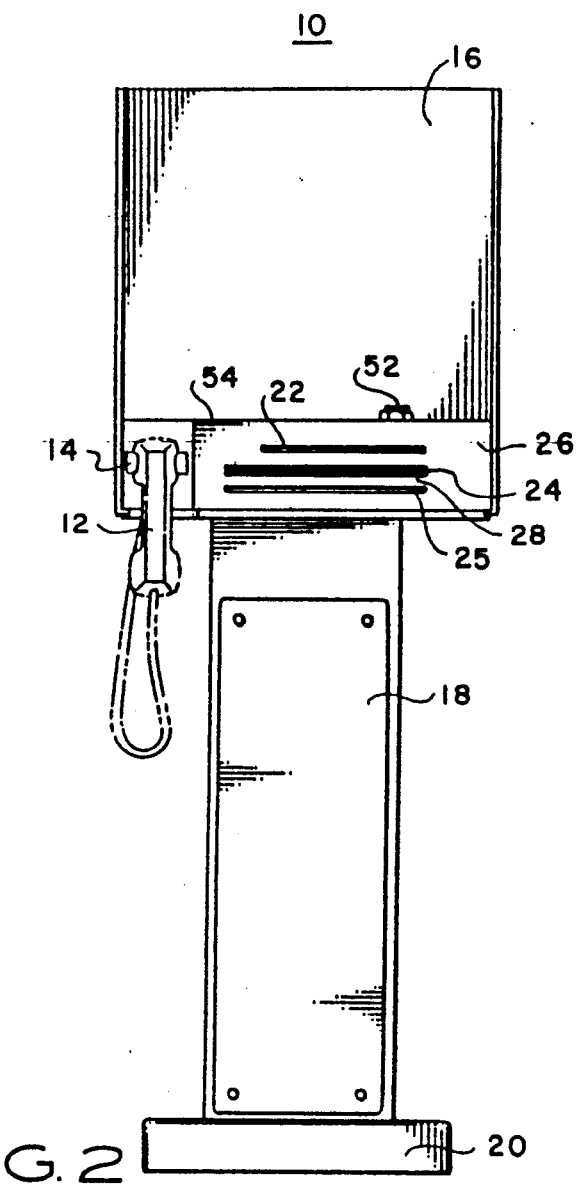
FIG. 2 is a front elevation view of the facsimile device of FIG. 1.

Referring to FIGS. 1 and 2, a conventional facsimile (fax) machine 10 is modified for public usage by removing the telephone handset, which is included as standard equipment on the machine, and the keyboard or other input device, by which one can directly access telephone lines by dialing the telephone number of another fax machine at the desired destination.

The standard handset is replaced by a armored handset 12 and a telephone hook switch 14, which holds handset 12 in an at rest position as shown when handset 12 is not in use. Special circuitry for interfacing fax machine 10 with existing telephone lines is also provided, as will be described in greater detail with reference to FIGS. 3 and 4.

Fax machine 10 is preferably disposed within a semi-enclosed housing 16 having an open front for permitting access to machine 10 and is supported from below by an upright support stand 18 and a relatively wide base member 20 beneath support stand 18. Fax machine 10 has three elongated slots 22, 24 and 25 along a front face 26 thereof. Documents are fed into fax machine 10 through middle slot 24 and returned to the user through bottom slot 25 after they have been 'read' by machine 10. Top slot 22 is used for emitting copies of documents transmitted to machine 10 from a remote location. A relatively flat tray 28 protrudes slightly outward from front face 26, just below middle slot 24, to act as a support for documents fed into middle slot 24.

Figure 3:
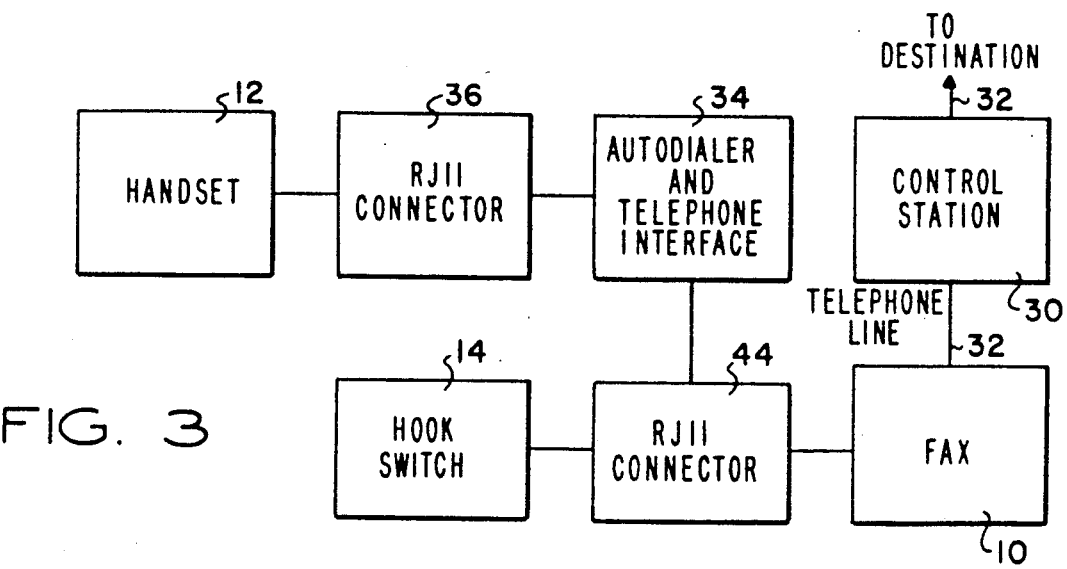
FIG. 3 is a simplified block diagram of a facsimile system according to the present invention.
Figure 4:
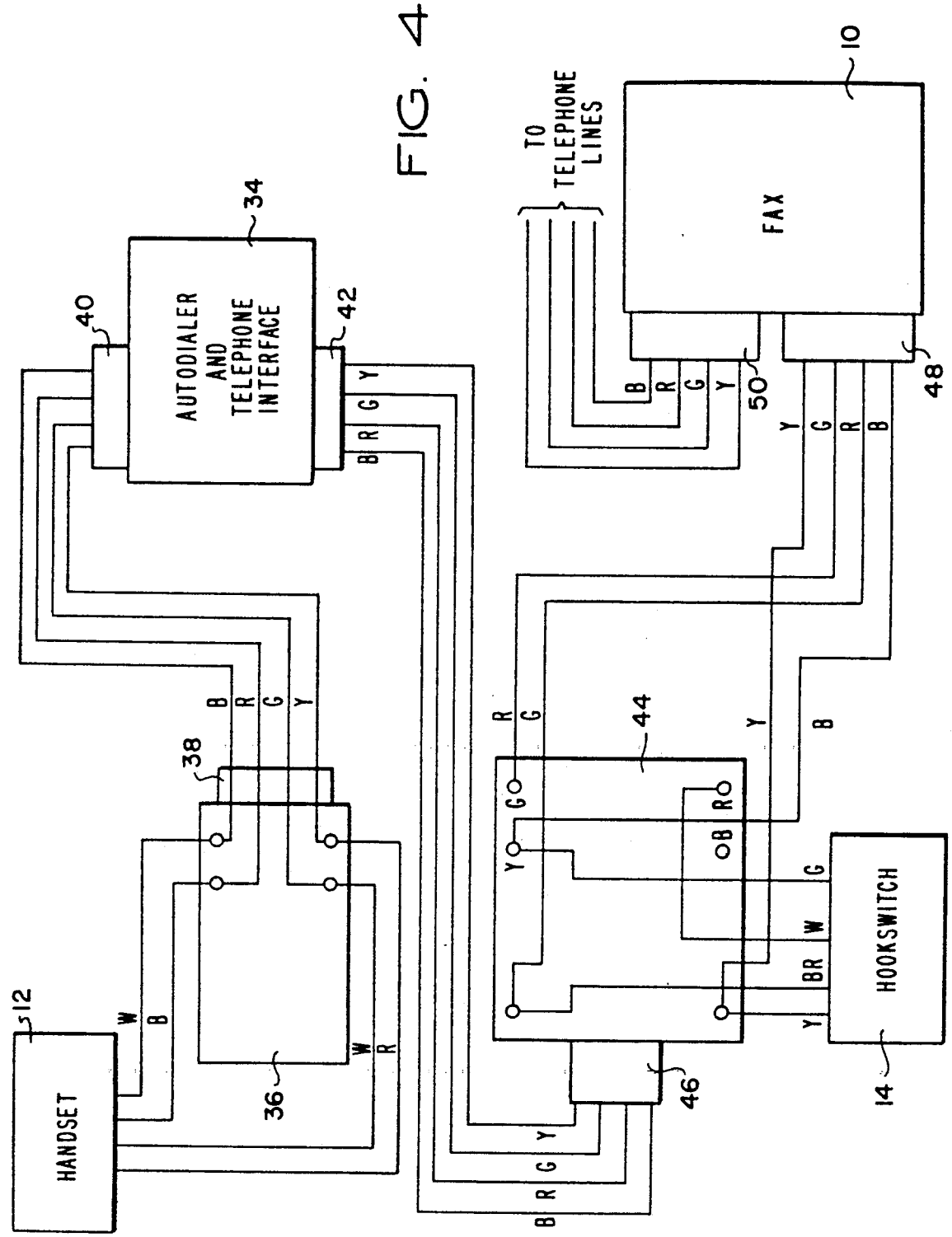
FIG. 4 is a schematic illustrating the electrical connections between the various components of the facsimile system according to the present invention.

Referring to FIGS. 3 and 4, apparatus is provided for controlling fax machine 10. The apparatus includes a control station 30, which effects a telephone connection between fax machine 10 and another fax machine at the destination via existing telephone lines 32. A connector device 34 preferably includes autodialer circuitry for automatically effecting a telephone connection between a user of fax machine 10 an operator at control station 30 in response to the removal of handset 12 from hook switch 14. Telephone interface circuitry is also provided for connecting fax machine 10 with the existing telephone lines 32. Connector device 34 is preferably a "hot line" telephone device, no. 2324, manufactured and sold by DDI/Buscom of Santa Clara, Ca., under the trademark "QUICK TOUCH II". If fax machine 10 has built-in telephone interface circuitry, the telephone interface circuitry can be eliminated from connector device 34, such that only autodialer circuitry would be included in connector device 34.

Electrical connections are effected by means of conventional telephone junction boxes and connector jacks. The electrical wires are color-coded, black (B), brown (BR), red (R), white (W), green (G) and yellow (Y), to facilitate the electrical connections. Handset 12 is coupled to device 34 by means of a RJ11 junction box 36 and an RJ11 output jack 38. Connector device 34 includes an RJ31 input jack 40 and an RJ11 output jack 42. Connector device 34 is coupled to fax machine 10 via a second RJ11 junction box 44, which includes an RJ11 input jack 46. The output from RJ11 box 44 is fed to an RJ44 input jack 48 at fax machine 10. Fax machine 10 is connected to existing telephone lines 32 by means of an RJ11 output jack 50. Hook switch 14 is connected to the apparatus by means of RJ11 junction box 44.

One skilled in the art will appreciate that all of the telephone connections are made via fax machine 10 to existing telephone lines 32. There is no need to tap in to telephone company lines. Rather, the connections are made using readily available telecommunications components, as described above.

In operation the user who desires to transmit data to a remote location will pick up handset 12, whereupon he will be connected by telelphone to a human operator at control station 30. The user will give the operator certain information, including the telephone number of the receiving fax machine and credit information pertaining to the user, which may include the user's credit card number. The operator will verify the user,s credit and, if the user's credit is satisfactory, the operator will complete the telephone connection between fax machine 10 and the fax machine at the destination, thereby enabling fax machine 10 to transmit data to the receiving fax machine.

Referring again to FIGS. 1 and 2, a transmit switch 52 is positioned on a top surface 54 of fax machine 10 for allowing the user to select when the transmission is to commence. When the user has loaded the document into fax machine 10 via middle slot 24 and the telephone connection has been effected with the destination fax machine, fax machine 10 will emit an audible sound, thereby alerting the user that he has been cleared to transmit data to the destination. Alternatively, or in addition to the aforementioned audible warning, a visual indicator light (not shown) can be used to alert the user that machine 10 is ready to transmit. Actual transmission of the document begins when the user activates switch 52.

The facsimile system according to the present invention, solves many of the problems associated with prior art public access facsimile systems. The user need not worry about having enough coins to operate the machine for a sufficient period of time and expensive and complicated credit card reading/verification circuitry is not needed. Furthermore, a live operator is available to help the user as need be.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. Apparatus for transmitting data from a first location to a second location via telecommunications link, comprising:
    facsimile means for reading the data and for producing an electronic image thereof;
    means for linking said facsimile means to an existing telecommunications system;
    a control station linked to said facsimile means via said existing telecommunications system; and
    means for automatically effecting a telephone connection between a user at said first location and a human operator at the control station, whereby the use can provide selected information, including the identity of the second location, to the control station, said control station for connecting said first and second locations via the existing telecommunications system to enable said image to be transmitted from said first location to said second location.

2. The apparatus of claim 1 wherein said linking means includes telephone interface means for connecting said facsimile means to existing telephone lines.

3. The apparatus of claim 1 wherein the selected information provided by the user to the operator at the control station includes credit information pertaining to the user and the telephone number of a facsimile machine at the second location for receiving the image transmission.

4. The apparatus of claim 1 further including user-operable means for transmitting said image to said second location after the first and second locations are connected via the existing telecommunications system.

5. The apparatus of claim 1 wherein said apparatus includes a telephone handset and a hook switch for receiving the handset when the handset is not in use, said handset having transducer means for converting sound energy into electrical energy and vice-versa, such that the user can communicate with the control station by voice communication.

6. The apparatus of claim 5 wherein said means for automatically effecting a telephone connection includes autodialer means responsive to the removal of the handset from the hook switch for automatically connecting the first location to the control station by telephone.

7. The apparatus of claim 6 wherein said autodialer means is interposed between said handset and said facsimile means, said facsimile means being interposed between said autodialer means and said control station, whereby the telephone connection between said first location and said control station is established via said facsimile means.

8. Apparatus for adapting a facsimile device for public usage, said facsimile device including means for reading a document and for producing an electronic image thereof and means for transmitting said image to a remote location by telecommunications link, said apparatus comprising:
    means for linking said facsimile device to an existing telecommunications system; and
    means for automatically effecting a telephone connection between a user of the facsimile device and a human operator at the control station, whereby the user can provide selected information, including the identity of the remote location, to the control station, said control station for connecting said facsimile device to said remote location via the existing telecommunications system to enable said facsimile device to transmit said image to said remote location.

9. The apparatus of claim 8 wherein said linking means includes telephone interface means for connecting said facsimile device to existing telephone lines.

10. The apparatus of claim 9 wherein the selected information provided by the user to the operator the control station includes credit information pertaining to the user and the telephone number of a facsimile machine at the remote location for receiving the image transmission.

11. The apparatus of claim 8 wherein said apparatus includes a telephone handset and a hook switch for receiving the handset when the handset is not in use, said handset having transducer means for converting sound energy into electrical energy and vice-versa, such that the user can communicate with the control station by voice communication.

12. The apparatus of claim 11 wherein said means for automatically effecting a telephone connection includes autodialer means responsive to the removal of the handset from the hook switch for automatically connecting the facsimile device to the control station by telephone.

13. The apparatus of claim 12 wherein said autodialer means in interposed between said handset and said facsimile device, said facsimile device being interposed between said autodialer means and said control station, whereby the telephone connection between said first location and said control station is established via said facsimile device.

14. A method for adapting a facsimile device, which is used for reading and transmitting image data via telecommunications link to a remote location, for public usage, said method comprising the following steps:
    linking the facsimile device to an existing telecommunications system;
    connecting the facsimile device to a control station so that the control station selectively controls the transmission of image data by the facsimile device;
    providing a telephone handset and user-operable switch means for activating the handset;
    automatically connecting a user of the facsimile device to a human operator at the control station by telephone in response to the activation of the handset, whereby the user can provide selected information, including the identity of the remote location, to the control station; and
    selectively connecting said facsimile device by telephone to the remote location via the control station to enable said facsimile device to transmit said image data to said remote location by the existing telecommunications system.

15. The method of claim 14 wherein the step of automatically connecting the user to the control station includes the step of automatically connecting the user with the human operator at the control station when the user activates the switch means.

16. The method of claim 15 further including the steps of interposing autodialer means between the handset and the facsimile device and connecting the autodialer means to the existing telecommunications system via the facsimile device, whereby the telephone connection between the handset and the control station is via the facsimile device.

* * * * *